United States Patent
Talmer

(10) Patent No.: US 12,463,510 B2
(45) Date of Patent: Nov. 4, 2025

(54) NEEDLE WINDING FOR HIGH DENSITY COPPER FILL INTERNAL TOOTH ELECTRIC MOTOR STATOR AND METHOD THEREFOR

(71) Applicant: Persimmon Technologies Corporation, Wakefield, MA (US)

(72) Inventor: Mark Talmer, Pepperell, MA (US)

(73) Assignee: Persimmon Technologies Corporation, Wakefield, MA (US)

(*) Notice: Subject to any disclaimer, the term of this patent is extended or adjusted under 35 U.S.C. 154(b) by 112 days.

(21) Appl. No.: 18/128,636

(22) Filed: Mar. 30, 2023

(65) Prior Publication Data
US 2023/0318412 A1 Oct. 5, 2023

Related U.S. Application Data

(60) Provisional application No. 63/325,173, filed on Mar. 30, 2022.

(51) Int. Cl.
| | | |
|---|---|---|
| *H02K 1/18* | (2006.01) | |
| *H02K 1/14* | (2006.01) | |
| *H02K 15/026* | (2025.01) | |
| *H02K 15/043* | (2025.01) | |

(52) U.S. Cl.
CPC ........... *H02K 15/026* (2013.01); *H02K 1/148* (2013.01); *H02K 1/18* (2013.01); *H02K 15/043* (2025.01); *H02K 2201/09* (2013.01)

(58) Field of Classification Search
CPC ........ H02K 1/148; H02K 15/026; H02K 1/18; H02K 15/0435; H02K 15/095; H02K 15/022
See application file for complete search history.

(56) References Cited

U.S. PATENT DOCUMENTS

| | | | | |
|---|---|---|---|---|
| 6,049,153 | A * | 4/2000 | Nishiyama | H02K 1/276 310/216.057 |
| 6,218,758 | B1 * | 4/2001 | Miura | H02K 3/18 310/216.071 |
| 2002/0060264 | A1 | 5/2002 | Burch | 242/432.3 |
| 2006/0124798 | A1 | 6/2006 | Burch et al. | 242/439.1 |
| 2013/0002058 | A1 * | 1/2013 | McIntosh | H02K 1/185 310/43 |
| 2014/0145547 | A1 * | 5/2014 | Nakano | H02K 1/165 310/216.069 |
| 2022/0302806 | A1 * | 9/2022 | Ohashi | H02K 3/345 |

* cited by examiner

*Primary Examiner* — Leda T Pham
(74) *Attorney, Agent, or Firm* — McCarter & English, LLP

(57) ABSTRACT

A segmented stator for an electric motor comprises: a plurality of tooth segments arranged in a circular configuration, the tooth segments having body portions and front surfaces extending inward from the body portions; and wire wound on the body portions. A distance between adjacently positioned front surfaces of the tooth segments is less than a width of the wire. The wire wound on the body portions substantially fills space between adjacently positioned tooth segments.

21 Claims, 8 Drawing Sheets

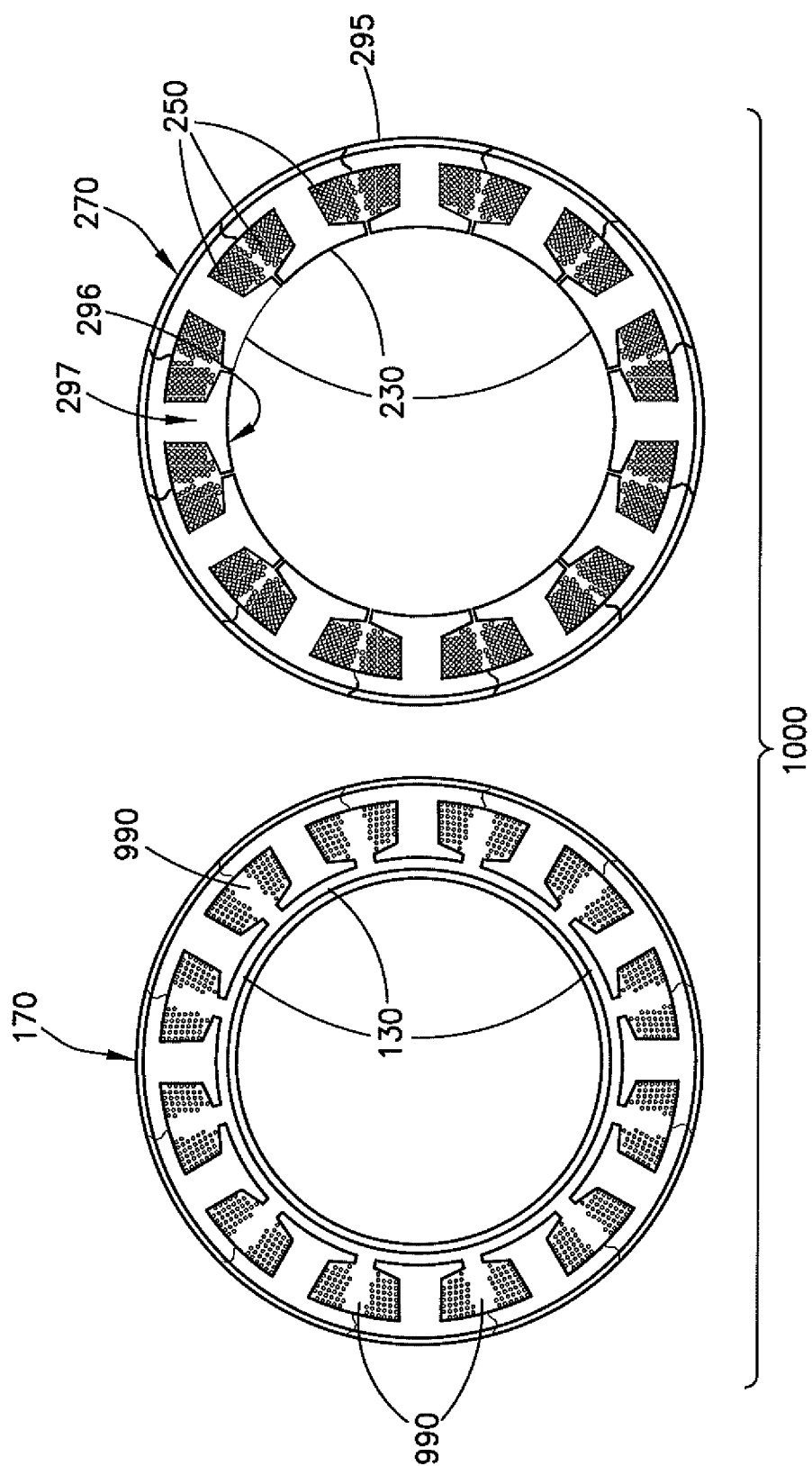

NEEDLE WINDING FOR HIGH DENSITY COPPER FILL INTERNAL TOOTH ELECTRIC MOTOR STATOR AND METHOD THEREFOR

CROSS REFERENCE TO RELATED APPLICATION

This application claims priority under 35 USC 119(e) to U.S. Provisional Application No. 63/325,173, filed Mar. 30, 2022, which is hereby incorporated by reference in its entirety.

BACKGROUND

Technical Field

The example and non-limiting embodiments relate generally to electric motors and, more particularly, to an apparatus and method for winding coils on stators of electric motors.

Brief Description of Prior Developments

Coils used in electric motors are generally placed in slots formed between radially inwardly extending teeth of a stator by winding copper wire directly onto the structures that form the stator teeth. In one method of winding the wire to form the coils, the wire is fed from a spindle or winding tool directly onto and around the tooth structure. The winding operation is carried out by directing the wire to desired locations on the teeth as the wire is fed from the winding tool, which is supported within the stator and is configured for reciprocating and rotating movement relative to the teeth of the stator. The reciprocating and radial movement, which is carried out while feeding the wire through the winding tool, facilitates the placement of the wire within the slots formed by the teeth of the stator.

SUMMARY

The following summary is merely intended to be exemplary. The summary is not intended to limit the scope of the claims.

In accordance with one aspect, an apparatus for connecting a plurality of stator segments to form a stator for an electric motor comprises: a winding nest; a plurality of stator segments coupled to the winding nest, the stator segments being movable on the winding nest in radial directions relative to an axis, the stator segments being movable between inwardly retracted positions and outwardly extended positions; and a winding tool removably positionable in the winding nest and rotatable about the axis, the winding tool being positionable between a first position out of the winding nest and a second position in the winding nest. The winding tool, when positioned in the second position in the winding nest, is configured to controllably wind a wire around the plurality of stator segments when the stator segments are positioned in the outwardly extended positions. When the winding tool is positioned in the first position and after winding the wire, the stator segments are positioned in the inwardly retracted positions to form a wound segmented stator.

In accordance with another aspect, an apparatus for forming a segmented stator for an electric motor, the apparatus comprises: a winding nest comprising a base and a plurality of holders removably arranged in a circular pattern on the base, the holders being positioned to be extendable in outward radial directions and retractable in inward radial directions; a plurality of tooth segments attachable to the holders; and a winding tool having a needle and being movable from a first position outside the winding nest to a second position in the winding nest, the winding tool being configured to receive a wire from an upstream wire source and feed the wire through the needle. Upon the holders being outwardly extended in the outward radial directions, the winding tool is movable from the first position to the second position such that the needle is extendable between the tooth segments and the winding tool is movable in at least two directions to wind the wire around the tooth segments to form coils around the tooth segments. Upon the winding tool being movable from the second position to the first position, the holders are retractable in the inward radial directions and the tooth segments are connected by the formed coils to form the segmented stator.

In accordance with another aspect, a method of forming a segmented stator for an electric motor comprises: fixing a plurality of tooth segments to a winding nest, the tooth segments being fixed to the winding nest in radially expanded positions; positioning a winding tool in the winding nest; operating the winding tool to wind a wire around the tooth segments to form coils; removing the winding tool from the winding nest; collapsing the tooth segments inwardly in radial directions; and performing a final wiring on the collapsed tooth segments to form a segmented stator.

In accordance with another aspect, A segmented stator for an electric motor comprises: a plurality of tooth segments arranged in a circular configuration, the tooth segments having body portions and front surfaces extending inward from the body portions; and wire wound on the body portions. A distance between adjacently positioned front surfaces of the tooth segments is less than a width of the wire. The wire wound on the body portions substantially fills space between adjacently positioned tooth segments.

BRIEF DESCRIPTION OF THE DRAWINGS

The foregoing aspects and other features are explained in the following description, taken in connection with the accompanying drawings, wherein:

FIG. 10 is a schematic representation comparing the stator of FIG. 1 and the segmented stator of FIG. 3 to illustrate differences in wiring density.

DETAILED DESCRIPTION

Figure 1:
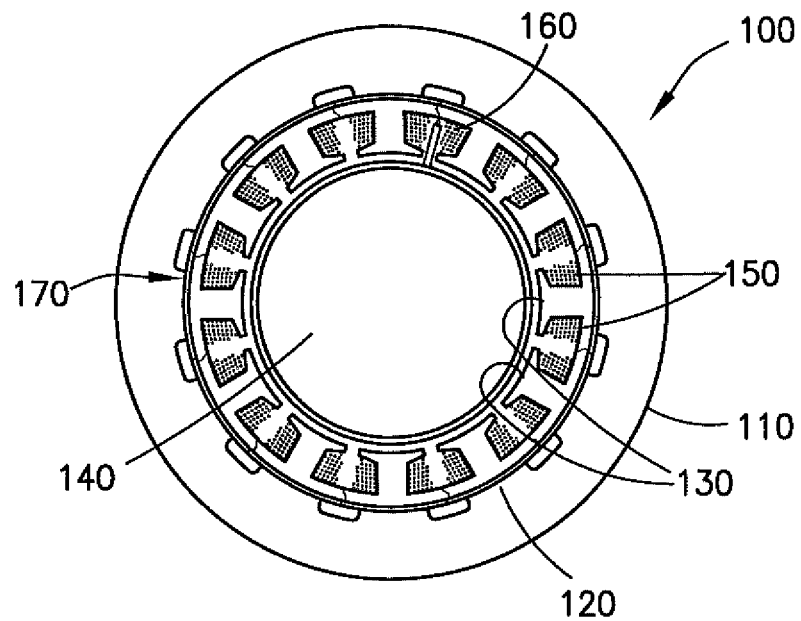
FIG. 1 is a schematic representation of a winding of a one-piece electric motor lamination stack to form a stator.
Figure 2:
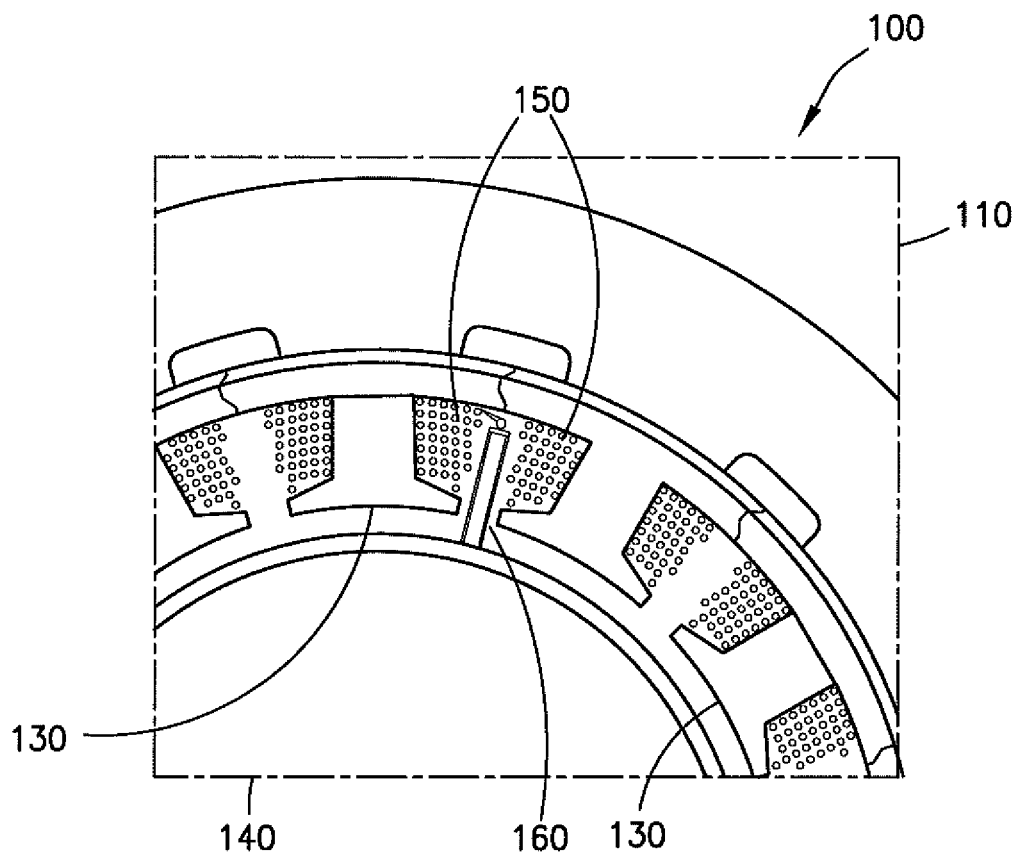
FIG. 2 is a schematic representation of a close up view of the winding of FIG. 1.

Referring to FIGS. 1 and 2, a traditional winding of a one-piece electric motor lamination stack is shown generally at 100 and is hereinafter referred to as "winding 100." The winding 100 is carried out using a winding nest 110 supported for rotatable movement using a motor. The winding nest 110 comprises an outer ring 120 having a plurality of twelve inwardly-extending teeth 130 having gaps between each tooth 130 and is formed as a stack of stamped sheets of metal. A winding spindle or winding tool 140 is positioned in the outer ring 120 to extend upwardly through the winding nest 110. The winding tool 140 is supported on a shaft having a wire guide that guides wire 150 into the winding tool 140 and feeds the wire 150 through a needle 160. The winding tool 140 is driven in reciprocating and oscillating or rotating movement by a drive mechanism located below the winding nest 110. The reciprocating and oscillating or rotating movement of the winding tool 140 facilitates the wrapping or winding of the wire 150 to form a coil around each tooth 130, the continuous coiled wire 150 and teeth 130 thus forming a stator 170.

Referring to FIG. 2, during operation, the needle 160 extends into the gaps between each tooth 130 to wrap or wind the wire 150 around each tooth 130, thereby forming the coils. The size of the physical gap between each tooth 130 is typically a compromised decision based on electrical design performance of the finished electric motor, maximum magnet winding wire size/gauge, needle design (width versus strength needed for winding forces without breaking the wire or causing the wire to flex beyond the gap), and clearance for the needle 160 between the teeth 130 of adjacently-wound coils. For example, in winding the coils onto teeth 130 that are fixed in place, the width of the needle is limited to the amount of space between each tooth 130. Thinner needles (such as needle 160) may flex, which may provide for a less effective winding pattern of the wire, and/or they may break, thus interrupting the winding operation altogether. As shown, even if the wire 150 is tightly wound around each tooth 130, a substantial amount of space or gap remains between the front surfaces of the teeth 130 upon retraction of the needle 160. Having such a large gap between the front surfaces of adjacent teeth 130 (due to the teeth 130 having to accommodate the needle 160) may compromise the smoothness of motor operation thereby resulting in a high amount of cogging. Furthermore, having unfilled space between the coils may compromise the power of the motor due to having less wire 150.

Figure 3:
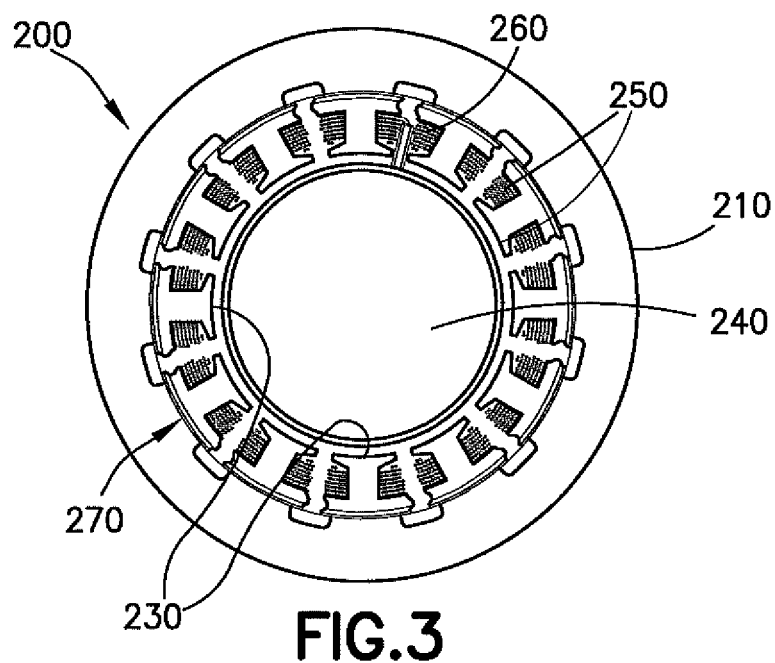
FIG. 3 is a schematic representation of one example embodiment of a segmented winding of a plurality of tooth segments to form a segmented stator.
Figure 4:
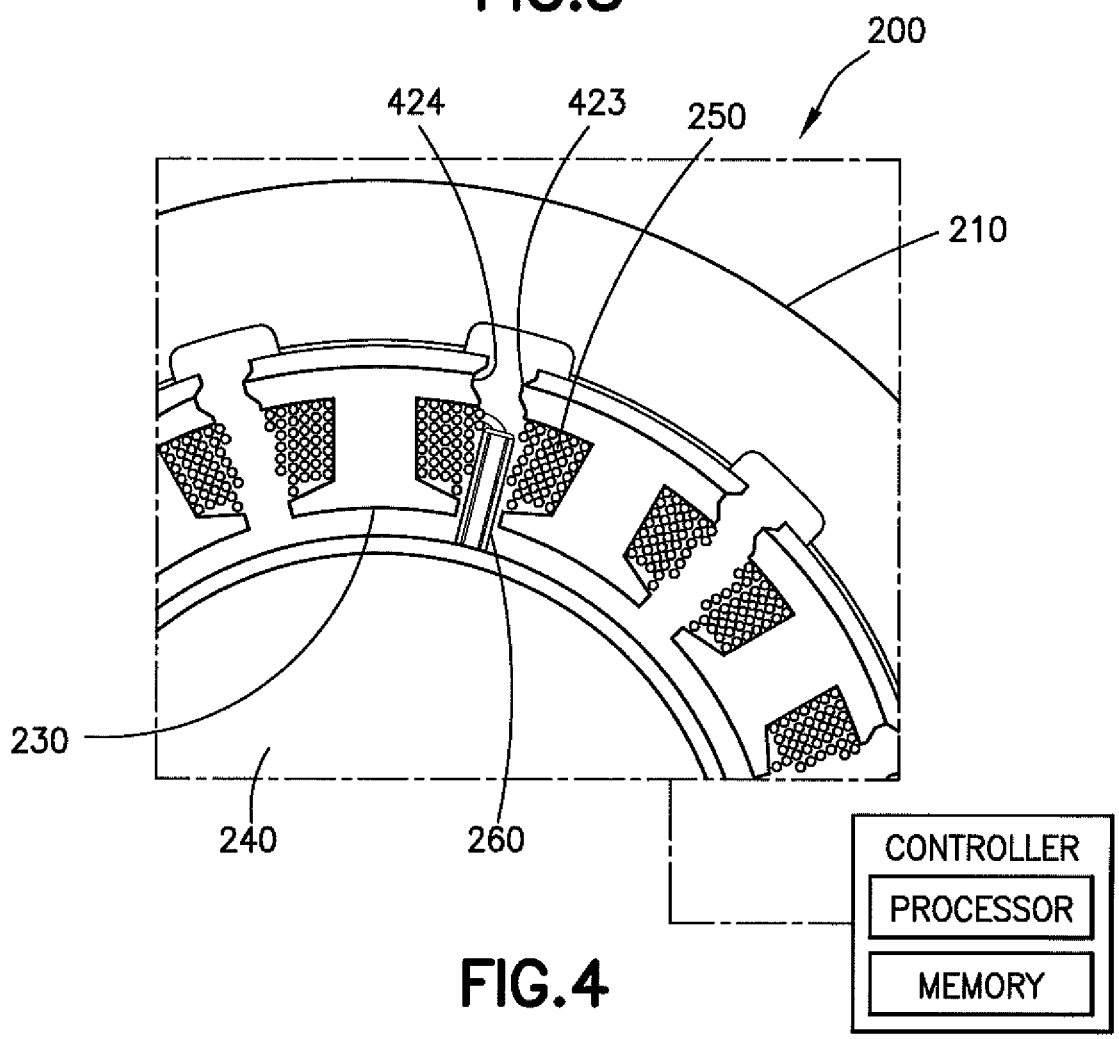
FIG. 4 is a schematic representation of a close up view of the segmented winding of FIG. 3.

Referring now to FIGS. 3 and 4, one example embodiment of a segmented stator lamination and custom winding is shown generally at 200 and is hereinafter referred to as "segmented winding 200." The example segmented winding 200 is carried out using a winding nest 210 supported for rotatable movement using a motor.

The winding nest 210 supports a plurality of tooth segments 230, each of the tooth segments 230 being formed from a plurality of stamped sheets of metal. Each of the tooth segments 230 are wound with a wire 250 and subsequently assembled to produce an example segmented stator 270 (shown at 270 in FIG. 10).

In forming the segmented winding 200, a winding tool 240 is positioned so as to extend upwardly through the winding nest 210, the winding tool 240 being supported on a shaft having a wire guide that receives the wire 250 from an upstream source, guides the wire 250 into the winding tool 240, and feeds the wire 250 through a needle 260 (or other wire feeding mechanism) extending from the winding tool 240. The winding tool 240 is driven in reciprocating and oscillating or rotating movement about the shaft by a drive mechanism located below the winding nest 210. The reciprocating and oscillating or rotating movement of the winding tool facilitates the movement of the needle 260 so as to wrap or wind the wire 250 around each tooth segment 230 when the tooth segments 230 are spaced apart in extended positions. Wrapping or winding the wire 250 forms a coil, the continuous coiled wire 250 and tooth segments 230 forming the segmented stator 270. As shown, the needle 260 is thicker than the needle 160 of FIG. 2 and, due to the increased amount of space between tooth segments 230 during the winding operation, the needle 260 can be more easily accommodated in the segmented winding 200, which leads to a more robust finished stator and allows for more wire 250 to be disposed between adjacent tooth segments 230 (the space between tooth segments 230 is more completely filled). A programmable controller 290 comprising a processor and at least one memory having software may be provided for controlling the winding operation.

Although twelve tooth segments 230 are shown for arrangement to form the segmented stator 270, any number of teeth segments 230 may be assembled with regard to the example disclosed embodiments. As can be seen in FIG. 4, a back end of each tooth segment 230 includes a protrusion 423 on one side and a groove 424 on another side such that when the tooth segments 230 are collapsed together on the winding nest 210 from the extended positions to the retracted positions the protrusions 423 engage the corresponding grooves 424 and can be assembled into a ring form.

Figure 5:
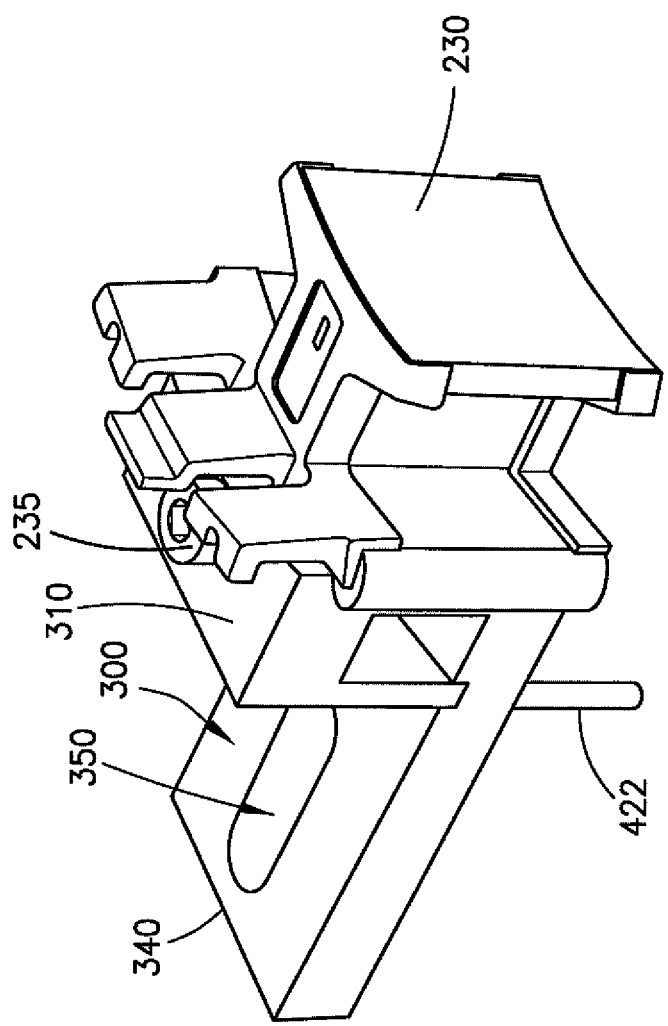
FIG. 5 is a perspective view of a tooth segment for segmented winding to form the segmented stator.

Referring to FIG. 5, one example embodiment of a tooth segment 230 supported on a holder 300 is shown. The holder 300 comprises a clamp 310 or clamping portion, the clamp 310 being configured to hold, clamp, or otherwise support the tooth segment 230, each tooth segment 230 being formed as a stack of metal-stamped laminations. A clamping effect may be carried out by a screw 235 or any other suitable device. The holder 300 also comprises an adjustment portion 340 having a slot 350 disposed therein, the slot 350 being configured to allow the holder 300 to receive a locking pin 450 and be slidably adjustably positioned and fixed to the winding nest 210. A guide peg 422 depends from the bottom of the holder 300, the guide peg 422 being configured to engage and slide in an angled channel 470 (as shown in FIG. 8) in order to effect the opening and closing of the holder 300 on the winding nest 210.

Figure 6:
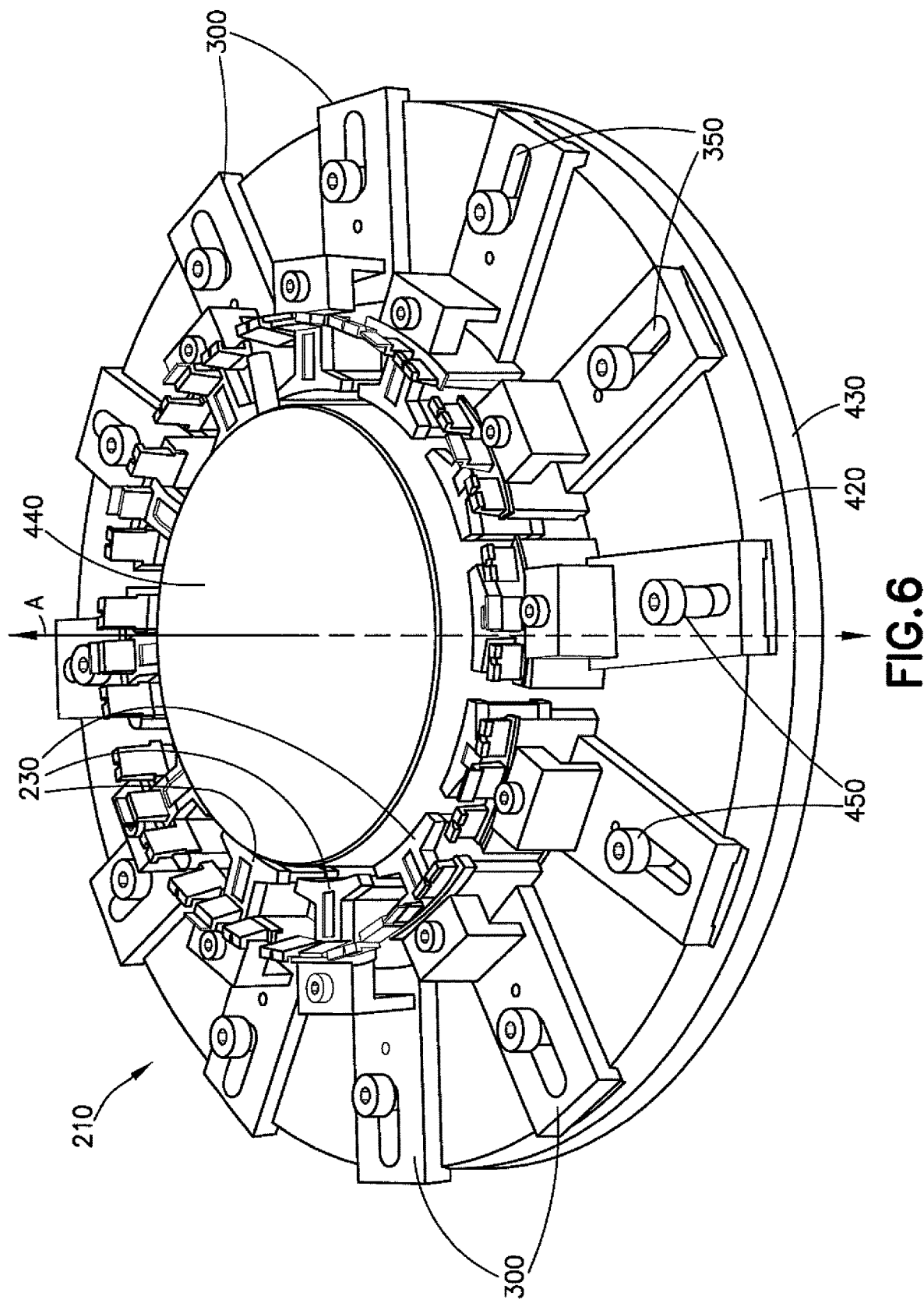
FIG. 6 is a perspective view of a winding nest for segmented winding with the tooth segments in "open" positions.
Figure 7:
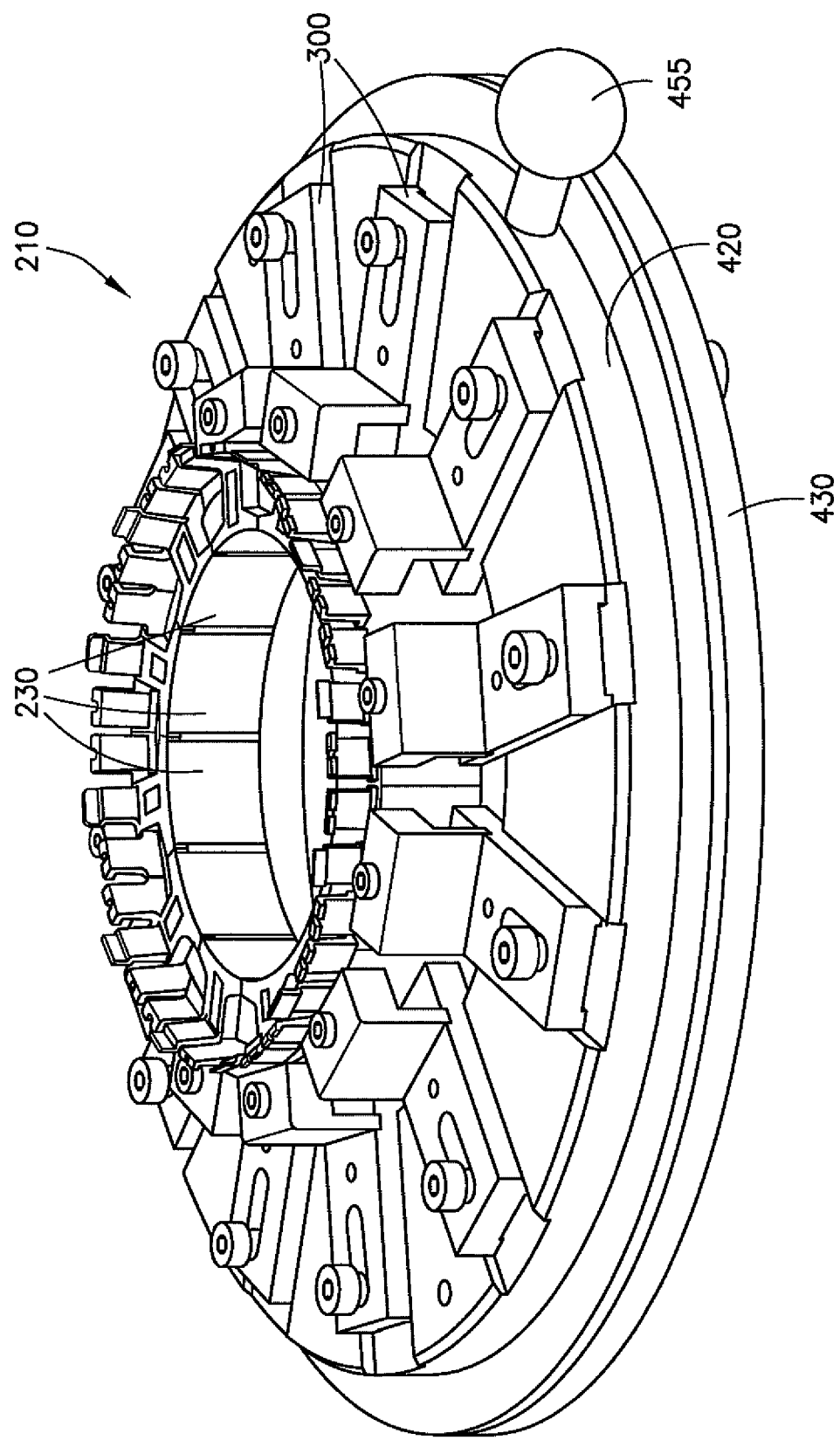
FIG. 7 is a perspective view of the winding nest of FIG. 6 with the tooth segments in "closed" positions.

Referring to FIGS. 6 and 7, the winding nest 210 is shown in more detail. As shown in FIG. 6, the winding nest 210 comprises a plurality of holders 300 movably arranged in radial directions on a base 420 rotatable about an axis A, the base 420 being supported on a support table 430. As shown in FIG. 6, the winding nest 210 is in an open- or winding position with a winding tool 440 shown in the center. The winding tool 440 may be a winding gun, available from WGE Equipment Solutions (Fort Wayne, Indiana). Each of the holders 300 are positioned to be extended in radial directions on the base 420 to provide a maximum amount of space between each individual tooth segment 230, thus allowing for a maximum fill of wire 250 on each tooth segment 230. The wire 250 may be copper, although other materials may be suitable for the wire. Each holder 300 is fixedly positioned on the base 420 via the locking pin 450 extending through each respective slot 350 and received into the base 420.

Referring to FIG. 7, the winding nest 210 is in a "closed" position on the base 420. As shown, the tooth segments 230 are not wired. Before being put into the closed position (for example, to carry out final wiring if the wiring process has already been performed), the winding tool 240 is removed from the winding nest 210.

Figure 8:
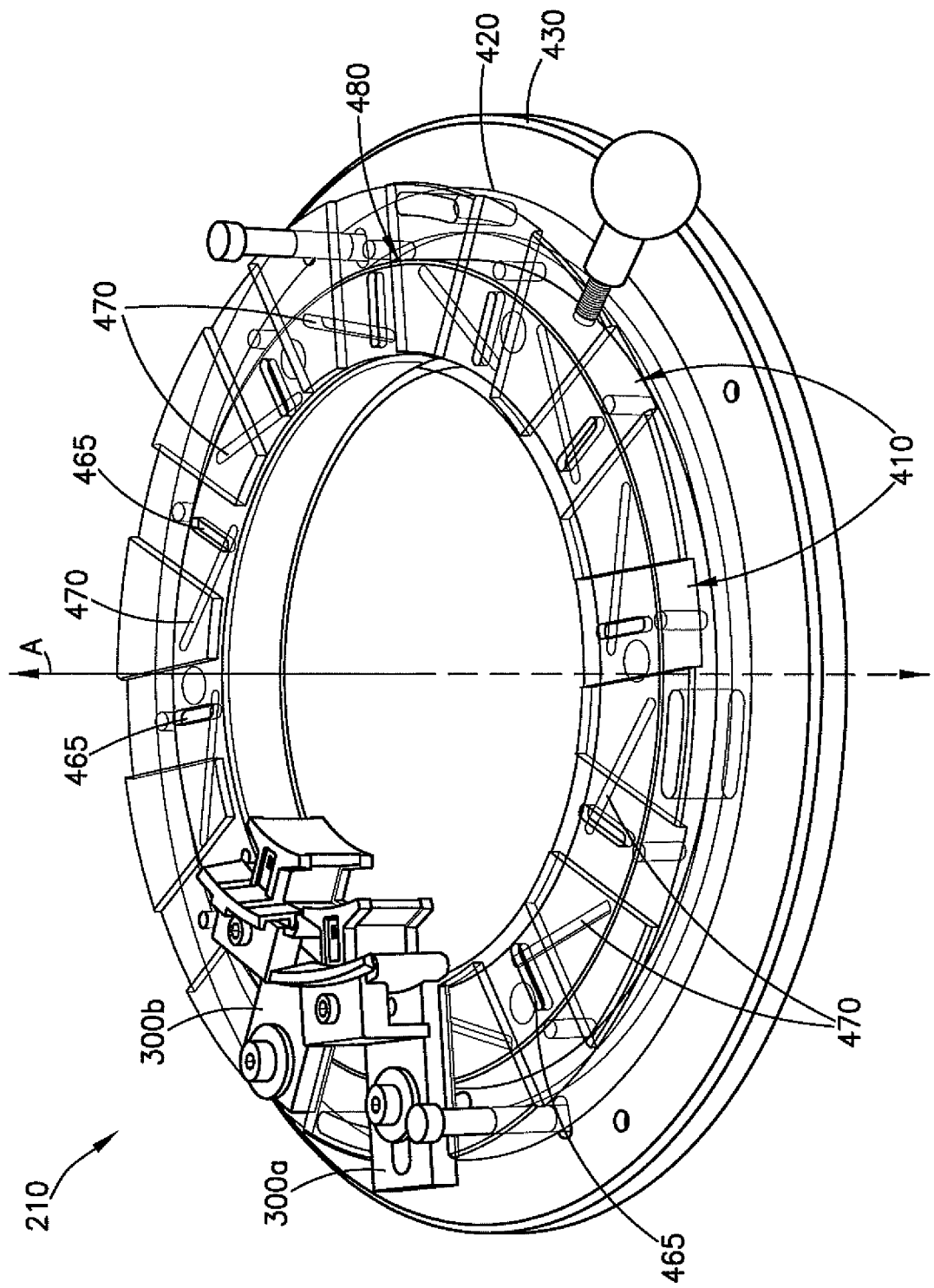
FIG. 8 is a perspective view of the winding nest showing one tooth segment in the "open" position and one tooth segment in the "closed" position.

Referring to FIG. 8, the winding nest 210 is shown with two holders positioned on the base 420, a first holder 300a being in an open position and second holder 300b being in a closed position. The base 420 includes recesses 410 extending radially from a center of the base 420 to the outer edge (twelve recesses 410, each recess 410 correspondingly accommodating a respective holder 300). When the holders 300 are positioned in the recesses 410 on the base 420, the guide peg 422 depending from the bottom of each holder 300 extends through a slot 465 in the base 420 and is positioned in a respective angled channel 470 in a rotation ring 480 under the base 420. A knob handle 455 is used to rotate the rotation ring 480 under the base 420. When the knob handle 455 is turned clockwise, for example, the base remains in a fixed position while the rotation ring 480 is rotated in a first direction, and the angled configurations of the channels 470 in the rotation ring 480 cause the guide pegs 422 extending from the bottom of each holder 300 to be driven radially inward to "close" the holders 300 on the base 420. The locking pins 450 can then be turned to lock the holders 300 in place. Turning the knob handle 455 counterclockwise, for example, causes the rotation ring 480 to rotate in a second direction opposite to the first direction to cause the guide pegs 422 to be driven radially outward to "open" the holders 300. The holders 300 all move in unison or synchronization to open or close. As shown, the holder 300a is in the open position and the holder 300b is in the closed position only to illustrate the travel limits of the holders 300.

Figure 9:
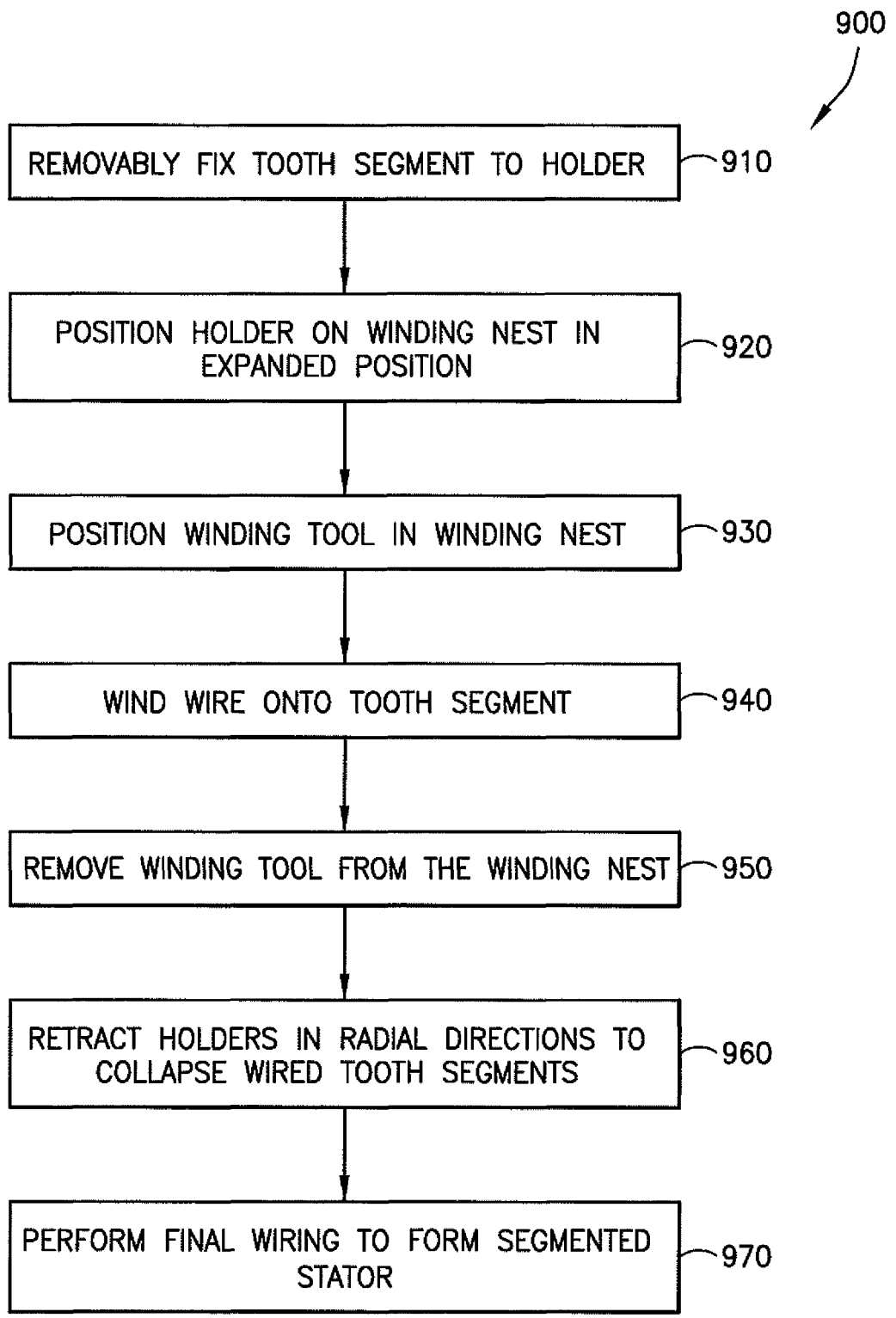
FIG. 9 is a flow showing example steps in a method of forming an example segmented stator.

Referring to FIG. 9, a flow illustrating one example method of winding single lamination stator teeth is shown generally at 900 and is hereinafter referred to as "method 900." In method 900, as indicated in step 910, a plurality of tooth segments are clamped or otherwise fixed to respective holders. Each tooth segment may comprise a plurality of stamped metal laminations stacked to form the tooth segment. At step 920, each holder is slidably positioned on a circular winding nest so as to be able to extend and retract in radial directions. The holders are extended in the radial directions. At step 930, the winding tool is positioned in the winding nest between the holders. At step 940, the wire is wound from the winding nest onto each tooth segment, when the tooth segments are positioned in the extended radial directions, to form an expanded wired stator component. At step 950, the winding tool is removed from the winding nest. At step 960, the holders are retracted in radial directions to collapse the wired tooth segments. At step 970, final wiring is performed on the collapsed wired tooth segments to form a segmented stator. The segmented stator, which is a collection of individual tooth segments bound together with wire, may be somewhat flexible. The final wiring may be carried out, for example, after removing the flexible segmented stator from the winding nest, placing the segmented stator onto a holder or the like, and compressing the elements of the flexible stator together. Either before or after the final wiring, the wired tooth segments may be mounted to a printed circuit board and epoxied or otherwise fixed into a rigid form.

Referring to FIG. 10, a comparison of the stator 170 and the segmented stator 270 is shown at 1000. As can be seen in the stator 170, empty space 990 between adjacent teeth 130 due to accommodation of the needle 160 is not utilized for wiring, whereas in the segmented stator 270 formed using the segmented winding process the empty space between adjacent tooth segments 230 has been filled with the wire 250 to form a denser wiring arrangement.

In the segmented stator 270, when the tooth segments 230 are assembled and mounted within an outer ring 295, front surfaces 296 are spaced from each other at a distance that is less than the width of the wire 250. Thus, the segmented stator 270 has narrower gaps between the front surfaces of adjacently-positioned tooth segments 230 and a denser copper fill in body portions 297 than does the stator 170. The narrower gaps may cause less power to be generated, but any reduction in power is regained by the denser copper fill in the body portions 297. In the segmented stator 270, the performance of a finished electric motor is not compromised due to the placement of the individual segments of the stator because the individual teeth segments 230 may be placed into a winding nest of larger diameter, compared to a traditional winding nest. This removes the physical design constraints of needle winding and provides for a maximum copper fill between adjacently-positioned teeth in the stator 270 to substantially fill the space. Substantial filling of the space means that the space is not configured to receive additional wire 250. Maximum copper fill coupled with closer spaced tooth segments (less than the width of the wire 250) provides for a motor that operates with a lower amount of cogging but with higher power as compared with state of the art motors, the motor operating smoother compared to motors having stators in which the teeth are further spaced from each other and in which less copper wire is wound. Furthermore, winding of a wire of a particular diameter or gauge is not limited to the needle design width or the tooth gap. Also, the needle width is not limited to the compromised design combination of the one-piece design choice of tooth gap and wire gauge.

Features as described herein may be provided in an apparatus. Features as described herein may be provided in a method of assembly for assembling an apparatus. Features as described herein may be provided in a method of using an apparatus with features as described above. Features as described herein may be provided in control software, embodied in a memory and capable of use with a processor, or controlling an apparatus with movement as described above.

In one example embodiment, an apparatus for connecting a plurality of stator segments to form a stator for an electric motor comprises: a winding nest; a plurality of stator segments coupled to the winding nest, the stator segments being movable on the winding nest in radial directions relative to an axis, the stator segments being movable between inwardly retracted positions and outwardly extended positions; and a winding tool removably positionable in the winding nest and rotatable about the axis, the winding tool being positionable between a first position out of the winding nest and a second position in the winding nest. The winding tool, when positioned in the second position in the winding nest, is configured to controllably wind a wire around the plurality of stator segments when the stator segments are positioned in the outwardly extended positions. When the winding tool is positioned in the first position and after winding the wire, the stator segments are positioned in the inwardly retracted positions to form a wound segmented stator.

The stator segments may be removably coupled to holders movable in the radial directions between the inwardly retracted positions and the outwardly extended positions. The holders may be movable in synchronized movement between the inwardly retracted positions and the outwardly extended positions. The winding tool may comprise a needle, the winding tool being configured to receive the wire from a wire source and to wind the wire around the stator segments upon feeding of the wire through the needle. The winding tool may comprise a controller having at least one processor and at least one non-transitory memory storing instructions that, when executed with the at least one processor, cause the winding tool to move in at least two directions to feed the wire through the needle and to wind the wire around the stator segments.

In another example embodiment, an apparatus for forming a segmented stator for an electric motor, the apparatus comprises: a winding nest comprising a base and a plurality of holders removably arranged in a circular pattern on the base, the holders being positioned to be extendable in outward radial directions and retractable in inward radial directions; a plurality of tooth segments attachable to the holders; and a winding tool having a needle and being movable from a first position outside the winding nest to a second position in the winding nest, the winding tool being configured to receive a wire from an upstream wire source and feed the wire through the needle. Upon the holders being outwardly extended in the outward radial directions, the winding tool is movable from the first position to the second position such that the needle is extendable between the tooth segments and the winding tool is movable in at least two directions to wind the wire around the tooth segments to form coils around the tooth segments. Upon the winding tool being movable from the second position to the first position, the holders are retractable in the inward radial directions and the tooth segments are connected by the formed coils to form the segmented stator.

The holders may be slidably extendable in recesses in radial directions on a surface of the base. The apparatus may further comprise a rotation ring positioned on a first surface of the winding nest opposite a second surface of the winding nest on which the holders are positioned, wherein upon rotation of the rotation ring, the holders are driven in the outward radial directions or the inward radial directions. The holders may include guide pegs depending from undersides thereof, wherein the holders are driven in the outward radial directions or the inward radial directions upon rotation of the rotation ring to cause a sliding of the guide pegs in angled channels in the base. The rotation ring may be movable relative to the base using a knob handle. The holders may be fixedly positionable on the base using locking pins. The tooth segments may comprise pluralities of laminations of metal stampings. The tooth segments may be interconnected at back ends of the tooth segments using a protrusion and groove arrangement. The apparatus may further comprise a controller coupled to the winding tool, the controller comprising at least one processor and at least one non-transitory memory storing instructions that, when executed with the at least one processor, controllably carry out a winding of the wire around the tooth segments.

In another example embodiment, a method of forming a segmented stator for an electric motor comprises: fixing a plurality of tooth segments to a winding nest, the tooth segments being fixed to the winding nest in radially expanded positions; positioning a winding tool in the winding nest; operating the winding tool to wind a wire around the tooth segments to form coils; removing the winding tool from the winding nest; collapsing the tooth segments inwardly in radial directions; and performing a final wiring on the collapsed tooth segments to form a segmented stator.

Fixing the plurality of tooth segments to the winding nest may comprise fixing the tooth segments to respective holders and fixing the holders to a base. Operating the winding tool to wind the wire around the tooth segments to form coils may comprise using a controller having at least one processor and at least one non-transitory memory storing instructions that, when executed with the at least one processor, controllably move the winding tool in at least two directions to wind the wire around the tooth segments. After collapsing the tooth segments and before performing the final wiring, the collapsed tooth segments may be removed from the winding nest, placed on a holder, and compressed together. After performing the final wiring, the tooth segments may be fixed into a rigid form. Fixing the tooth segments into the rigid form may comprise epoxying the tooth segments together.

In another example embodiment, a segmented stator for an electric motor comprises: a plurality of tooth segments arranged in a circular configuration, the tooth segments having body portions and front surfaces extending inward from the body portions; and wire wound on the body portions. A distance between adjacently positioned front surfaces of the tooth segments is less than a width of the wire. The wire wound on the body portions substantially fills space between adjacently positioned tooth segments.

The distance between the adjacently positioned front surfaces may lower an amount of cogging in a motor in which the segmented stator is incorporated. Amounts of the wire wound on body portions may increase an amount of power in the motor in which the segmented stator is incorporated. The wire may be copper wire. The segmented stator may further comprise a removable ring to which the plurality of tooth segments may be clamped to an inner surface thereof. The removable ring, the plurality of tooth segments, and the wire may be fixed into a rigid structure using an epoxy.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An apparatus for connecting a plurality of stator segments to form a stator for an electric motor, the apparatus comprising:
    a winding nest;
    a plurality of stator segments coupled to the winding nest, the plurality of stator segments being movable on the winding nest in radial directions relative to an axis, the plurality of stator segments being movable between inwardly retracted positions and outwardly extended positions; and
    a winding tool removably positionable in the winding nest and rotatable about the axis, the winding tool being positionable between a first position out of the winding nest and a second position in the winding nest;
    wherein the winding tool, when positioned in the second position in the winding nest, is configured to controllably wind a wire around the plurality of stator segments when the plurality of stator segments are positioned in the outwardly extended positions; and wherein when the winding tool is positioned in the first position and after winding the wire, the plurality of stator segments are positioned in the inwardly retracted positions to form a wound segmented stator.

2. The apparatus of claim 1, wherein the plurality of stator segments are removably coupled to holders movable in the radial directions between the inwardly retracted positions and the outwardly extended positions.

3. The apparatus of claim 2, wherein the holders are movable in synchronized movement between the inwardly retracted positions and the outwardly extended positions.

4. The apparatus of claim 1, wherein the winding tool comprises a needle, the winding tool being configured to receive the wire from a wire source and to wind the wire around the plurality of stator segments upon feeding of the wire through the needle.

5. The apparatus of claim 4, wherein the winding tool comprises a controller having at least one processor and at least one non-transitory memory storing instructions that, when executed with the at least one processor, cause the winding tool to move in at least two directions to feed the wire through the needle and to wind the wire around the plurality of stator segments.

6. An apparatus for forming a segmented stator for an electric motor, the apparatus comprising:
a winding nest, comprising,
a base; and
a plurality of holders removably arranged in a circular pattern on the base, the holders being positioned to be extendable in outward radial directions and retractable in inward radial directions;
a plurality of tooth segments attachable to the holders; and
a winding tool having a needle and being movable from a first position outside the winding nest to a second position in the winding nest, the winding tool being configured to receive a wire from an upstream wire source and feed the wire through the needle;
wherein upon the holders being outwardly extended in the outward radial directions, the winding tool is movable from the first position to the second position such that the needle is extendable between the plurality of tooth segments and the winding tool is movable in at least two directions to wind the wire around the plurality of tooth segments to form coils around the tooth segments;
wherein upon the winding tool being movable from the second position to the first position, the holders are retractable in the inward radial directions and the plurality of tooth segments are connected by the formed coils to form the segmented stator.

7. The apparatus of claim 6, wherein the holders are slidably extendable in recesses in radial directions on a surface of the base.

8. The apparatus of claim 6, further comprising a rotation ring positioned on a first surface of the winding nest opposite a second surface of the winding nest on which the holders are positioned, wherein upon rotation of the rotation ring, the holders are driven in the outward radial directions or the inward radial directions.

9. The apparatus of claim 8, wherein the holders include guide pegs depending from undersides thereof, wherein the holders are driven in the outward radial directions or the inward radial directions upon rotation of the rotation ring to cause a sliding of the guide pegs in angled channels in the base.

10. The apparatus of claim 8, wherein the rotation ring is movable relative to the base using a knob handle.

11. The apparatus of claim 6, wherein the holders are fixedly positionable on the base using locking pins.

12. The apparatus of claim 6, wherein the plurality of tooth segments comprises pluralities of laminations of metal stampings.

13. The apparatus of claim 6, wherein the plurality of tooth segments are interconnected at back ends of the plurality of tooth segments using a protrusion and groove arrangement.

14. The apparatus of claim 6, further comprising a controller coupled to the winding tool, the controller comprising at least one processor and at least one non-transitory memory storing instructions that, when executed with the at least one processor, controllably carry out a winding of the wire around the plurality of tooth segments.

15. A method of forming a segmented stator for an electric motor, the method comprising:
fixing a plurality of tooth segments to a winding nest, the plurality of tooth segments being fixed to the winding nest in radially expanded positions;
positioning a winding tool in the winding nest;
operating the winding tool to wind a wire around the plurality of tooth segments to form coils;
removing the winding tool from the winding nest;
collapsing the plurality of tooth segments inwardly in radial directions; and
performing a final wiring on the plurality of collapsed tooth segments to form a segmented stator;
wherein operating the winding tool to wind the wire around the plurality of tooth segments to form coils comprises using a controller having at least one processor and at least one non-transitory memory storing instructions that, when executed with the at least one processor, controllably move the winding tool in at least two directions to wind the wire around the plurality of tooth segments.

16. The method of claim 15, wherein fixing the plurality of tooth segments to the winding nest comprises fixing the plurality of tooth segments to respective holders and fixing the holders to a base.

17. The method of claim 15, wherein after collapsing the plurality of tooth segments and before performing the final wiring, the collapsed plurality of tooth segments are removed from the winding nest, placed on a holder, and compressed together.

18. The method of claim 17, wherein after performing the final wiring, the plurality of tooth segments are fixed into a rigid form.

19. The method of claim 18, wherein fixing the plurality of tooth segments into the rigid form comprises epoxying the tooth segments together.

20. A method of forming a segmented stator for an electric motor, the method comprising:
fixing a plurality of tooth segments to a winding nest, the plurality of tooth segments being fixed to the winding nest in radially expanded positions;
positioning a winding tool in the winding nest;
operating the winding tool to wind a wire around the plurality of tooth segments to form coils;
removing the winding tool from the winding nest;
collapsing the plurality of tooth segments inwardly in radial directions; and
performing a final wiring on the plurality of collapsed tooth segments to form a segmented stator;

wherein after collapsing the plurality of tooth segments and before performing the final wiring, the collapsed plurality of tooth segments are removed from the winding nest, placed on a holder, and compressed together.

21. A method of forming a segmented stator for an electric motor, the method comprising:
   fixing a plurality of tooth segments to a winding nest, the plurality of tooth segments being fixed to the winding nest in radially expanded positions;
   positioning a winding tool in the winding nest;
   operating the winding tool to wind a wire around the plurality of tooth segments to form coils;
   removing the winding tool from the winding nest;
   collapsing the plurality of tooth segments inwardly in radial directions; and
   performing a final wiring on the plurality of collapsed tooth segments to form a segmented stator;
   wherein after performing the final wiring, the plurality of tooth segments are fixed into a rigid form.

\* \* \* \* \*